(12) United States Patent
Curry et al.

(10) Patent No.: US 10,891,387 B2
(45) Date of Patent: Jan. 12, 2021

(54) SECURE DISTRIBUTION OF AN IMAGE

(71) Applicant: SmartFrame Technologies Limited, London (GB)

(72) Inventors: Shaun Curry, London (GB); Patrick Krupa, Berlin (DE); Artur Wisniewski, Cracow (PL)

(73) Assignee: SmartFrame Technologies Limited, London (GB)

( * ) Notice: Subject to any disclaimer, the term of this patent is extended or adjusted under 35 U.S.C. 154(b) by 48 days.

(21) Appl. No.: 15/762,463

(22) PCT Filed: Sep. 15, 2016

(86) PCT No.: PCT/GB2016/052888
§ 371 (c)(1),
(2) Date: Mar. 22, 2018

(87) PCT Pub. No.: WO2017/051152
PCT Pub. Date: Mar. 30, 2017

(65) Prior Publication Data
US 2018/0268150 A1    Sep. 20, 2018

(30) Foreign Application Priority Data

Sep. 23, 2015 (GB) ................................. 1516880.0
May 4, 2016 (GB) ................................. 1607819.8

(51) Int. Cl.
*G06F 21/60* (2013.01)
*H04N 1/44* (2006.01)
(Continued)

(52) U.S. Cl.
CPC ............ *G06F 21/606* (2013.01); *G06F 21/10* (2013.01); *G11B 20/0021* (2013.01);
(Continued)

(58) Field of Classification Search
CPC ......... G06F 2221/0724; G11B 20/0021; G06T 3/0093
See application file for complete search history.

(56) References Cited

U.S. PATENT DOCUMENTS 8,189,781 B1 * 5/2012 Hartman .................. G09C 5/00
380/210
2009/0097769 A1 * 4/2009 Velasquez ............. G06F 17/243
382/249
(Continued)

FOREIGN PATENT DOCUMENTS

EP          2107792 A1    10/2009

OTHER PUBLICATIONS

Piao, Yong-Ri, Dong-Hak Shin, and Eun-Soo Kim. "Robust image encryption by combined use of integral imaging and pixel scrambling techniques." Optics and Lasers in Engineering 47.11 (2009): 1273-1281. (Year: 2009).*

(Continued)

*Primary Examiner* — Madhuri R Herzog
(74) *Attorney, Agent, or Firm* — Alston & Bird LLP

(57) ABSTRACT

A method for the display of an image in a display area, the method comprising: requesting, from a server, a scrambled image file using an image identifier, the scrambled image file containing the image in a scrambled form; receiving the scrambled image file; dividing the scrambled image file into a plurality of image fragments, the image fragments having a first order within the scrambled image file; and rendering the image fragments on to the display area in a second order derived from the image identifier to display the image in unscrambled form.

26 Claims, 5 Drawing Sheets

(51) Int. Cl.
  *H04N 21/4408* (2011.01)
  *H04N 21/4367* (2011.01)
  *H04N 21/2347* (2011.01)
  *H04N 21/4405* (2011.01)
  *G11B 20/00* (2006.01)
  *G06F 21/10* (2013.01)
  *H04L 29/06* (2006.01)
  *G06T 3/00* (2006.01)
  *G06T 3/60* (2006.01)

(52) U.S. Cl.
  CPC ......... *H04L 63/0428* (2013.01); *H04N 1/448* (2013.01); *H04N 21/2347* (2013.01); *H04N 21/4367* (2013.01); *H04N 21/4405* (2013.01); *H04N 21/4408* (2013.01); *G06F 2221/0724* (2013.01); *G06T 3/0093* (2013.01); *G06T 3/60* (2013.01)

(56) References Cited

U.S. PATENT DOCUMENTS

| | | | |
|---|---|---|---|
| 2009/0245513 A1* | 10/2009 | Takahashi | H04N 1/4486 380/54 |
| 2011/0013849 A1* | 1/2011 | Saito | H04N 19/61 382/233 |
| 2013/0279690 A1 | 10/2013 | Durham et al. | |
| 2014/0173692 A1* | 6/2014 | Srinivasan | H04W 12/02 726/4 |
| 2014/0177836 A1* | 6/2014 | Wu | G09C 5/00 380/243 |

OTHER PUBLICATIONS

International Searching Authority, International Search Report and Written Opinion for International Application No. PCT/GB2016/052888, dated Nov. 18, 2016, 11 pages, European Patent Office, Netherlands.

* cited by examiner

SECURE DISTRIBUTION OF AN IMAGE

CROSS REFERENCE TO RELATED APPLICATIONS

This application is a National Stage Application, filed under 35 U.S.C. 371, of International Application No. PCT/GB2016/052888, filed Sep. 15, 2016, which claims priority to Great Britain Application No. 1516880.0, filed Sep. 23, 2015, and Great Britain Application No. 1607819.8, filed May 4, 2016; the contents of all of which as are hereby incorporated by reference in their entirety.

This invention relates to a method for the display of an image.

DESCRIPTION OF RELATED ART

It is increasingly common for media files, such as image files, video files and music files, to be shared over computer networks, and, in particular, the internet. This sharing over a computer network permits people who possess those media files to share them with people who wish to consume those media files. The consumption of the media file may be the viewing of it in the case of an image file, may be the listening to it in the case of a music file, and may be the viewing and listening in the case of a video. The possessors of the media files may be the owners of the rights to the content contained in the media file. For instance, the media file may contain an image taken by a photographer and the possessor may be the photographer, or other person, who owns the rights to the use of that image.

The computer networks, and the internet in particular, have made it easier to share such media files that using more conventional methods of distribution such through the post or in magazines or newspapers. This ease of sharing has disadvantages for the rights owner because it is more straightforward for someone with access to the media file, but without permission to distribute the media file, to share that media file with other people who wish to consume that media file. This can cause problems for the rights owner because the rights owner may wish to restrict access to the media file, or, at least, charge for access to it or charge for its use in particular circumstances.

This problem associated with the sharing of media files is particularly acute when the media files are images. This is because image files are easily displayed in internet browsers on the web pages that make up the internet and to permit the display of the images files they tend to be publically available for download from the servers that host the website. Such an arrangement means that it is easy for someone visiting a website to download an image file. Once the visitor has downloaded the image file, the visitor can then easily modify, distribute, and/or sell that image file even if the rights owner of the image file has not given permission to do so.

The use and/or redistribution of image files is a problem for rights owners especially if they would like to charge for the use and/or redistribution of that image file. For instance, photographers may charge a fee for the commercial use of a picture or may wish to restrict the use of the picture to particular settings or environments.

Various methods have been proposed and used in the past to attempt to prevent the download of image files from websites or to prevent or detect the redistribution of images without the rights owner's permission.

One such method involves preventing a user from being able to instruct their internet browser to save a copy of the image file to somewhere other than the server that is hosting the image. One way in which the user can instruct the internet browser to save a copy is to bring up the context menu associated with the image and select the menu item that saves a copy to the device being used to access the website. Alternatively, the source code for the website can be inspected and the location of the image on the server identified so that the image file can be accessed directly to download a copy from the internet server. The preventative method can involve attempting to disable the user's ability to call those context menus so that the user cannot save, or identify the location of the image. These preventative methods are easily overcome by a user who is intent of downloading a copy of the image either by accessing the source code of the webpage separately from the internet browser or by not running the code that disables access to the context menu.

Another method involves either visibly watermarking the images so that it is clear from looking at the image that it is being distributed without permission or encoding in to the image details of the rights holder so that the redistributed image can be identified at a later date. The visible watermark may not be ideal because it alters the visual impression of the image and the watermark may distract the viewer from the content of the image. The encoding in to the image details of the rights holder does not prevent the distribution of the image only the identification later on that the rights belonged to the rights owner.

It is therefore desirable for there to be an improved method of protecting the display of image files to prevent unauthorised use or distribution of those image files.

BRIEF SUMMARY

According to a first aspect of the present invention there is provided a method for the display of an image in a display area, the method comprising: requesting, from a server, a scrambled image file using an image identifier, the scrambled image file containing the image in a scrambled form; receiving the scrambled image file; dividing the scrambled image file into a plurality of image fragments, the image fragments having a first order within the scrambled image file; and rendering the image fragments on to the display area in a second order derived from the image identifier to display the image in unscrambled form.

Requesting a scrambled image file may comprise sending a request to the server for the scrambled image file, the request comprising the image identifier. The request may comprise a desired image size for the image, and the received scrambled image file may comprise an unscrambled image size. The desired image size may define the dimensions of the image.

The image identifier may be associated with the image. Dividing the scrambled image file into a plurality of image fragments may be based on the image identifier. Dividing the scrambled image file into a plurality of image fragments may be defined by a slicing map, the slicing map defining the boundary between image fragments within the scrambled image file.

The method may comprise reordering the image fragments in to the second order based on the image identifier. Each image fragment may have a position within the scrambled image file as defined by the first order, and the reordering the image fragments may comprise altering the position of each image fragment based on the image identifier.

Rendering the image fragments on to the display area may comprise rendering each of the reordered image fragments to a different particular location within the display area. Rendering the image fragments on to the display area may comprise rendering the image fragments on to a virtual layer within the display area. Rendering the image fragments on to the display area may comprise rendering the image fragments on to the display area without identifying those image fragments as an image. Rendering the image fragments on to the display area may comprise drawing the image fragments on to a canvas layer. Rendering the image fragments on to the display area may comprise rendering the image fragments on to the display area of a browser window.

The method may comprise, after dividing the scrambled image file into a plurality of image fragments, applying a reverse image transformation to at least one image fragment to form a transformed image fragment; and wherein rendering the image fragments may comprise rendering the transformed image fragments in place of the respective at least one image fragments. The reverse image transformation applied to a particular image fragment may comprise one or more of a group of image transformations. The group of image transformations may comprise: applying a colour offset to the image fragment, rotating the image fragment, and applying a reversible geometric distortion to the image fragment.

According to a second aspect of the present invention there is provided a method for the display of an image in a display area of a browser window, the method comprising: requesting, from a server, a scrambled image file using an image identifier, the scrambled image file containing the image in a scrambled form; receiving the scrambled image file; dividing the scrambled image file into a plurality of image fragments, the image fragments having a first order within the scrambled image file; and rendering the image fragments on to the display area of the browser window in a second order derived from the image identifier to display the image in unscrambled form.

Requesting a scrambled image file may comprise sending a request to the server for the scrambled image file, the request comprising the image identifier. The request may comprise a desired image size for the image, and the received scrambled image file may comprise an unscrambled image size. The desired image size may define the dimensions of the image.

The image identifier may be associated with the image. Dividing the scrambled image file into a plurality of image fragments may be based on the image identifier. Dividing the scrambled image file into a plurality of image fragments may be defined by a slicing map, the slicing map defining the boundary between image fragments within the scrambled image file.

The method may comprise reordering the image fragments in to the second order based on the image identifier. Each image fragment may have a position within the scrambled image file as defined by the first order, and the reordering the image fragments may comprise altering the position of each image fragment based on the image identifier.

Rendering the image fragments on to the display area of the browser window may comprise rendering each of the reordered image fragments to a different particular location within the display area of the browser window. Rendering the image fragments on to the display area may comprise rendering the image fragments on to a virtual layer within the display area of the browser window. Rendering the image fragments on to the display area may comprise rendering the image fragments on to the display area of the browser window without identifying those image fragments as an image within the browser. Rendering the image fragments on to the display area may comprise drawing the image fragments on to a canvas layer within the browser window.

The method may comprise, after dividing the scrambled image file into a plurality of image fragments, applying a reverse image transformation to at least one image fragment to form a transformed image fragment; and wherein rendering the image fragments may comprise rendering the transformed image fragments in place of the respective at least one image fragments. The reverse image transformation applied to a particular image fragment may comprise one or more of a group of image transformations. The group of image transformations may comprise: applying a colour offset to the image fragment, rotating the image fragment, and applying a reversible geometric distortion to the image fragment.

According to a third aspect of the present invention there is provided a method for scrambling an image file, the method comprising: receiving the image file, the image file being associated with an image identifier; dividing the image file into a plurality of image fragments, the image fragments having a first order within the image file; and generating a scrambled image file comprising the plurality of image fragments, the image fragments having a second order, derived from the image identifier, within the scrambled image file.

Dividing the image file into a plurality of image fragments may be based on the image identifier. Dividing the image file into a plurality of image fragments may be defined by a slicing map, the slicing map defining the boundary between image fragments within the image file.

The method may comprise reordering the image fragments into the second order based on the image identifier. Each image fragment may have a position within the image file as defined by the first order, and the reordering the image fragments may comprise altering the position of each image fragment based on the image identifier.

The method may comprise, after dividing the image file into a plurality of image fragments, applying an image transformation to at least one image fragment to form a transformed image fragment; and wherein the scrambled image file may comprise the transformed image fragments in place of the respective at least one image fragment. The image transformation applied to a particular image fragment may comprise one or more of a group of image transformations. The group of image transformations may comprise: applying a colour offset to the image fragment, rotating the image fragment, and applying a reversible geometric distortion to the image fragment.

The method may comprise generating the image identifier for the image file. Receiving the image file may comprise receiving the image file from an upload device and the method may comprise authenticating the upload device prior to accepting a connection to receive the image file. The method may comprise receiving a desired scrambled image size, and, prior to dividing the image file, resizing the image file according to the desired scrambled image size. The desired scrambled image size may comprise at least one of a desired image width and desired image height.

The method may comprise transmitting the scrambled image file. Transmitting the scrambled image file may comprise transmitting the scrambled image file to an upload device.

BRIEF DESCRIPTION OF THE FIGURES

The present invention will now be described by way of example with reference to the accompanying drawings. In the drawings.

DETAILED DESCRIPTION OF VARIOUS EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for the display of an image in a web page display area of a browser window. The method comprises requesting from a server a scrambled image file using an image identifier that identifies the image to be displayed in unscrambled form. The scrambled image file is received by the browser and is divided in to a plurality of image fragments. The image fragments having a first order within the scrambled image file. The browser then renders the image fragments on to the display area of the browser window in a second order to display the image in unscrambled form. The second order for the image fragments being derived from the image identifier. The first order for the image fragments and the second order for the image fragments may be different.

Figure 1:
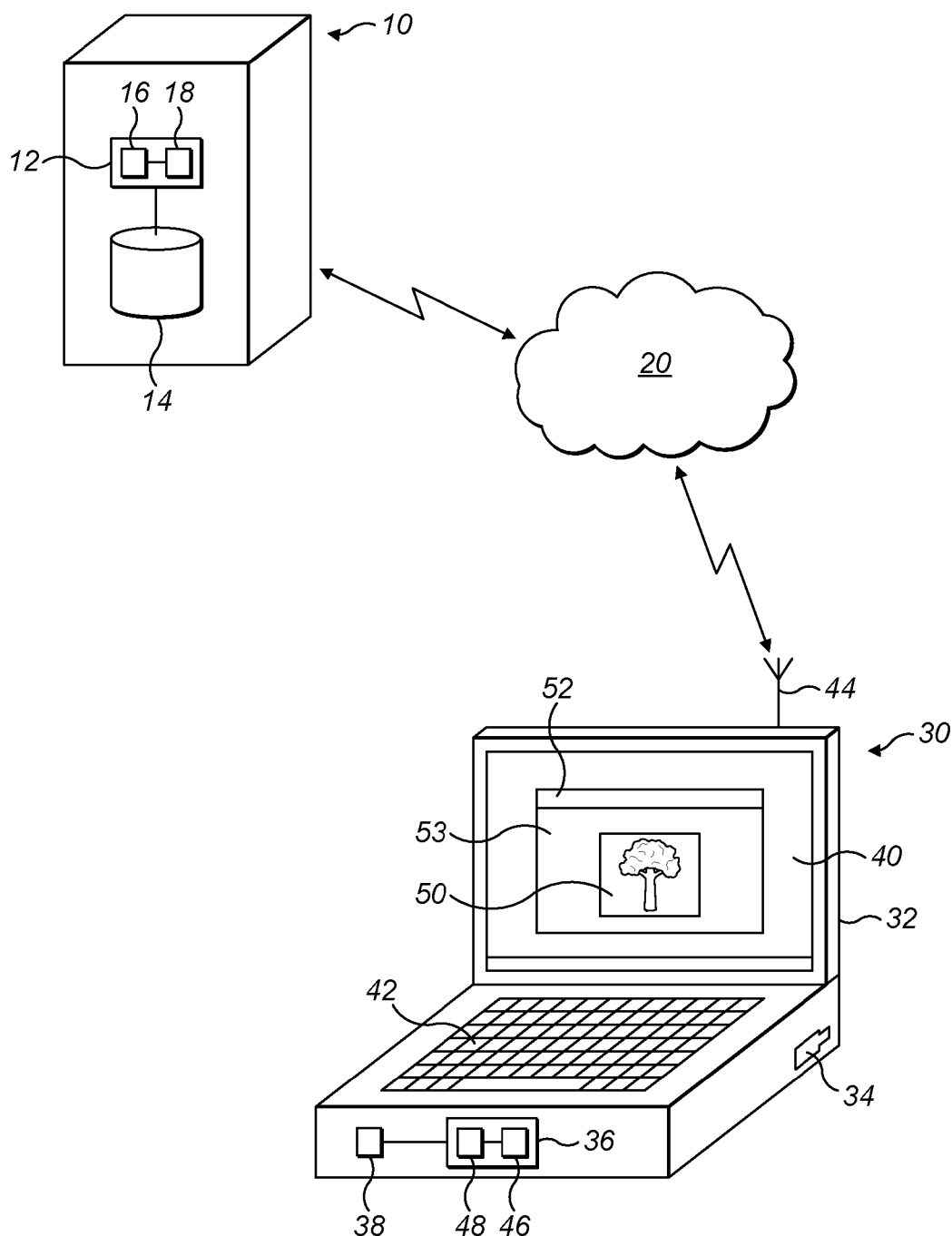
FIG. 1 shows an example system that may implement the methods described herein.

FIG. 1 shows an example system that can permit the display of image files in a secure manner. The system comprises a server 10. It will be appreciated that whilst reference may be made to a single server 10, this server could be part of a cluster of servers or may be a virtual server running in a cloud-based, virtual environment. The server 10 may comprise a processing section 12 and a storage location 14. The server may be capable of implementing methods described herein to process image files and provide secure access to those image files. These methods may be implemented and controlled by the processing section 12. The processing section could perform its methods using dedicated hardware, using a general purpose processor executing software code, or using a combination of the two. A processor 16 executes software code stored in a non-transient way in software memory 18 in order to perform its methods. The processing section can read/write data from/to storage location 14. The storage location 14 may be in the form of a memory. Storage location 14 may comprise non-volatile memory, may be in the form of an array of discrete banks of memory such as hard disks. Whilst shown in FIG. 1 as schematically being part of server 10, the storage location 14 may be separate to server 10 and connected to server 10. The above described image files may be stored in storage location 14.

The server 10 may be connected to a computer network 20 to permit the sharing of image files. Computer network 20 may be made up of many network segments that are connected together and so may be a large distributed network such as the internet or another public network.

Also connected to computer network 20 may be a user terminal 30. Typically the user terminal 30 will be remote from the server 10. User terminal 30 may be located in a different country and even on a different continent from the server 10. User terminal 30 may be a computer, such as a desktop or laptop computer; a portable device, such as a laptop, tablet computer or smartphone; or a smart TV or other device that can connect to remote servers using computer network 20 to access remote content located on servers such as server 10 to permit a user to send and receive information over computer network 20.

As shown in FIG. 1, the user terminal 30 may comprise a housing 32. The user terminal may comprise a battery 34, a processing section 36 and a memory 38. The user terminal 30 may also comprise a user interface constituted by a display 40 and a series of user-actuable switches 42. The display and switches could be combined into a touchscreen device. The user terminal 30 may comprise a wireless communication device 44 for communicating with computer network 20. The user terminal 30 may comprise a wired communication device for communicating with computer network 20. The user terminal 30 may be capable of implementing methods described herein to process image files and provide secure access to those image files. These methods may be implemented and controlled by the processing section 36. The processing section 36 could perform its methods using dedicated hardware, using a general purpose processor executing software code, or using a combination of the two. A processor 46 executes software code stored in a non-transient way in software memory 48 in order to perform its methods. The processing section can read/write data from/to memory 38. The memory 38 may be a storage location for data. Memory 38 may comprise non-volatile memory, may be in the form of an array of discrete banks of memory such as hard disks. Whilst shown in FIG. 1 as schematically being part of user terminal 30, the memory 38 may be separate to user terminal 30 and connected to user terminal 30.

In FIG. 1, user terminal 30 is shown schematically displaying an image file 50 within an internet browser window 52 using display 40. The internet browser window 52 comprises a display area 53. The internet browser may use display area 53 for the display of webpages that have been accessed over the internet 20 or other computer network 20. The display area 53 may display content items 50. Those content items 50 may have been received from a server 10 over a communications network 20. The content items 50 that are displayed in the display area 53 and the way in which those content items 50 are displayed may be specified by code, stored on server 10, that may be interpreted by user terminal 30 to display those content items 50 on display area 53. As discussed above, the code may be in the form of a webpage. Such a webpage may be accessed by an internet browser. Whilst traditionally internet browsers 52 may have been a separate application running on user terminal 30, it will be appreciated that the term internet browser may encompass a part of another application that displays a webpage within that application. In this case the internet browser itself may be embodied by and/or be part of the other application. The area of the other application may then suitably be the display area 53 of the internet browser. In this way, another application may be capable of interpreting the code, stored on server 10, so as to display those content items 50 on display area 53. At least one of those content items may be image file 50.

The secure storage, transmission and display of those image files will now be described with reference to the figures.

Figure 2:
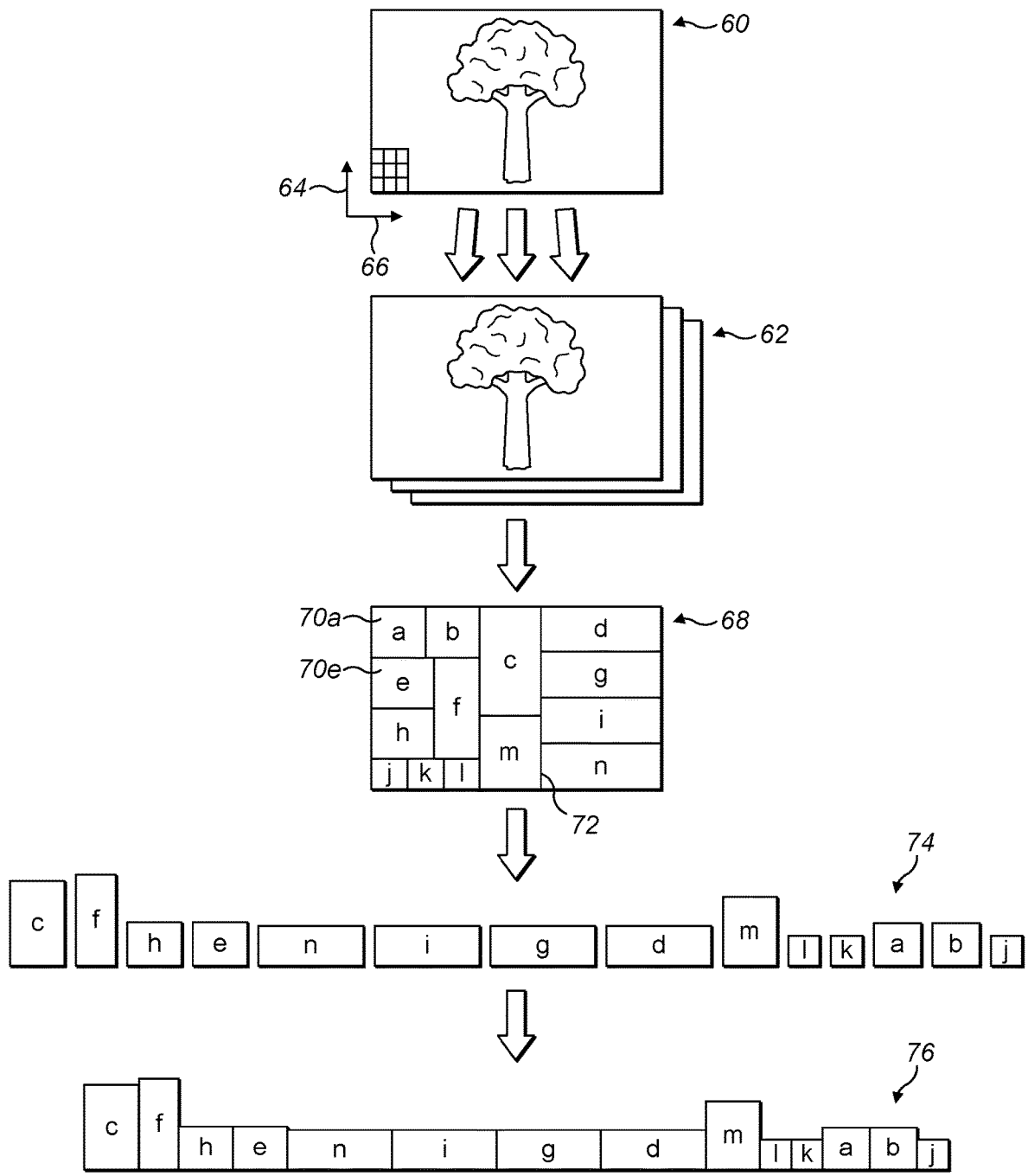
FIG. 2 shows a schematic representation of the process for scrambling image files.
Figure 3:
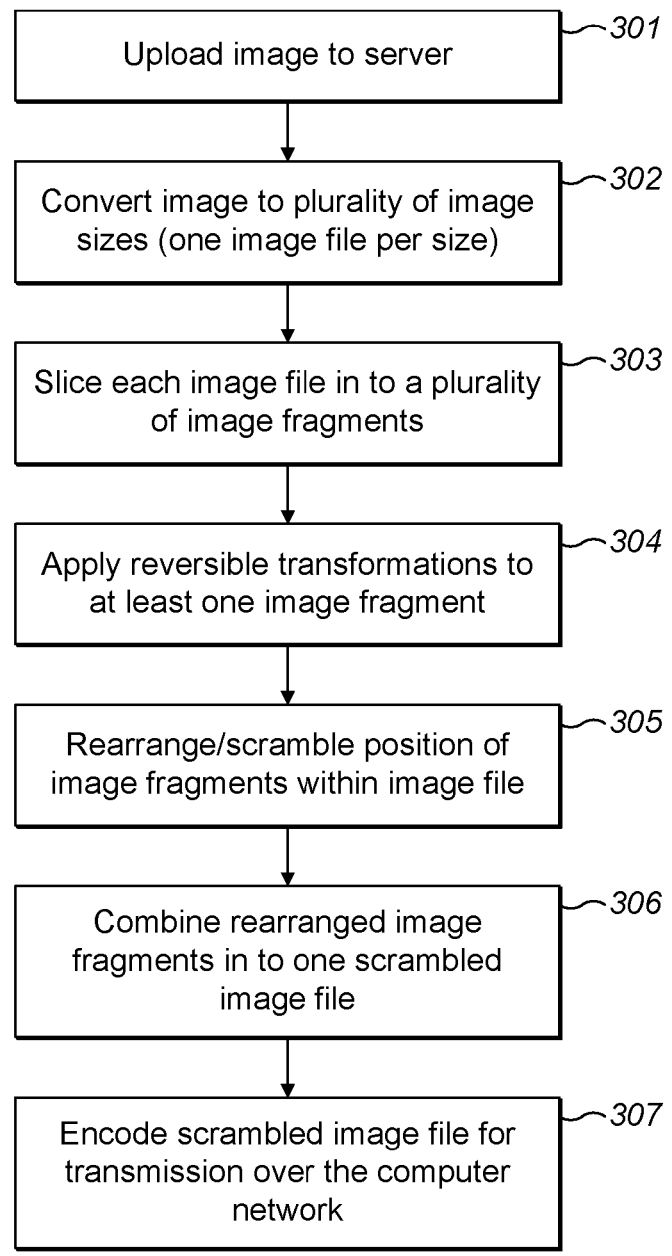
FIG. 3 shows a flow diagram of the process for scrambling image files.

FIG. 2 is a schematic representation of the process for converting image files in to a secure format for storage of those image files. This method may be generally implemented on the server 10 described above. FIG. 3 shows a flow diagram of the process for converting image files in to a secure format. It will be appreciated that although a number of steps are shown in the flow diagram in FIG. 3 in series at least some of those steps are optional and the other steps may be implemented whilst omitting those optional steps.

As shown in 301, a user may upload at least one image file 60 to the server 10 over the computer network 20. The image file 60 may be stored in storage location 14. The user may use user terminal 30 to upload the at least one image file. Each original image file 60 may be assigned a unique image file identifier by the server 10. This assignment may occur at the time of upload of the image file 60 or may occur when the image file 60 is processed to secure that image file 60.

The image file 60 may be a vector image file. A vector image file may define the content of the image file by describing a plurality of elements that together make up the image file. For instance, these elements may be vectors. These vectors may be defined by reference to control points or nodes which may define points along the vector to thus give each vector shape. The vectors may have any of a plurality of attributes associated with it such as colour, shape, curve, thickness and/or fill. A vector image file may comprise any image content, for example a vector image file may comprise elements that defines graphics and/or text. Parts of the vector image file may comprise elements that defines raster images. One type of vector image file is a Scalable Vector Graphics (SVG) as defined by the World Wide Web Consortium. Another type of vector image file is a Portable Document Format (PDF) as defined, for example, by ISO 32000-1.

The image file 60 may be a raster image file. A raster image file may define the content of the image file using a grid of pixels. The pixels may individually define points of colour. The grid may be rectangular. The raster image file may comprise a defined value for each pixel. The raster image file may utilise a form of compression so that the value of each pixel can be derived from a smaller set of values.

The image file 60 may comprise more than one image. For example, the image file 60 may comprise a series of images that are configured to be displayed one after the other. The image file 60 may be configured to display the series of images in a loop. The image file 60 may be an animated image file.

As shown in 302, the raw image file 60 may optionally be converted into a plurality of converted image files 62. This conversion may be undertaken by server 10. The converted image files 62 may be stored in storage location 14. At least some of these converted image files 62 may have been resized relative to the original image file 60. It will be appreciated that one of the converted image files 62 may be the original image file 60 that has not been resized. At least some of the other of the converted image files 62 may be versions of the original image file that have been reduced in size. At least some of the other of the converted image files 62 may be versions of the original image file that have been increased in size. It is envisaged that the process is more likely to be used to produce reduced size converted image files 62 relative to the size of the original image file 60. This is advantageous because the server 10 is capable of running more complicated, and potentially more processor-time expensive, algorithms in converting the image file 60 to different sizes than may be available to the internet browser 52, or other application, where the image file 60 may be displayed.

The original image file 60 may be comprised of a plurality of pixels arranged in a grid. The grid may have two axes 64, 66 that are perpendicular to each other. The size of the original image 60 can therefore be described with reference to the number of pixels that are comprised in the image file 60 along each of the two axes 64, 66. The resizing of the original image 60 may therefore comprise reducing or increasing the number of pixels that are comprised in the image file and so the reducing or increasing the number of pixels along each of the two axes 64, 66 within the image file. Generally this may involve the interpolation of pixels of the image file to combine the information contained in two or more pixels when the size of the image file is reduced. This may also involve the expansion of a pixel to spread the information contained in one or more pixels to more than one pixel.

The converted image files 62 for one original image file 60 may share an image file identifier. The server 10 may select a particular converted image file 62 to send to the user terminal 30 as described below when the image file 60 associated with the image file identifier is requested by the user terminal 30.

If the above conversion is undertaken for the uploaded image file(s) 60, then after the conversion method, the converted image files 62 may then be processed to convert them to a secure image file format for storage as outlined below. It will be appreciated that the below described method may be undertaken on the original image 60 without any conversion to other sized images. The below description of the method for securing an image file is made by reference to an image file, it will be appreciated that this may refer to a converted image file 62 or an original image 60 file as described above.

As shown in 303, the image file 68 is broken down into a plurality of image fragments 70. The size and shape of the plurality of image fragments 70 may be defined by a slicing map 72. A slicing map 72 defines the cuts through the image file 68 to create the plurality of image fragments 70. Two of these image fragments 70a and 70e are labelled in FIG. 2. The slicing map 72 is the set of lines that define the exterior surfaces of the image fragments 70 when arranged in their original position. The slicing map 72 may define the positions at which the image file is to be sliced up in to the image fragments. The positions of the slicing map 72 may define where the content of the image file is to be sliced. For instance, slices may cut the content that defines the image, e.g. cut the elements of a vector image file or cut the portions of pixels of a raster image file, into the fragments. As shown in FIG. 2, the slicing map 72 may be an irregular grid in which the exterior surfaces of the image fragments 70 are a network of lines that cross each other to form a series of squares and/or rectangles that may be differently sized. The plurality of image fragments 70 may each be a square or rectangle. Some of the plurality of image fragments 70 may be the same size and shape. It is however envisaged that the slicing map 72 may be generated such that the shape of at least some of the image fragments 70 are different to the shape of at least some of the other image fragments 70. Each image fragment 70 may have a variable size relative to the other image fragments 70.

The slicing map 72 may be generated based on the unique image identifier that is associated with that image file 68. The slicing map 72 may therefore be different for each image file 68 that has a different image identifier. A standard slicing map 72 may be used for more than one image file 68 each having different image identifiers. In this way, the slicing map 72 may not be generated based on a unique image identifier but be defined as part of the securing method.

As shown in 304, the server 10 may optionally apply reversible transformations to at least one of the image fragments 70. The reversible transformation that is applied to a particular image fragment 70 may be calculated based on the image identifier. These transformations are intended to obscure or alter the appearance of the image contained in the image fragment 70 so as to make it more difficult to work out the original location of each image fragment 70 in the image file 68. The transformation is reversible in that the transformation can be applied in reverse to remove the transformation without degrading the original image fragment content. The reversible transformation may include one or more of the following:

Applying a colour offset to the image fragment 70. The transformation may alter the colour space of an image fragment 70 thus changing the colour constituents of the image fragment 70 from the original colour constituents of that image fragment 70. The colour offset that is applied to the image fragment may non-uniform across the image fragment. For instance, a graduated colour offset across a first dimension of the image fragment may be applied. The type and amount of colour offset to be applied to an individual image fragment 70 may be calculated based on the unique image identifier of the image file 68. The colour space of an image fragment 70 may be inverted.

Rotating the image fragment 70. The angle of rotation may be calculated based on the unique image identifier of the image file 68. The angle of rotation may be such that after rotation there is a one-to-one mapping between pixels before rotation and after rotation. Stated differently: the image fragment 70 may be rotated so that no interpolation of pixels is required of the original image fragment 70 after the rotation has been completed. The angle of rotation may therefore cause the pixels to line up with the pixel axes 64 and 66 as defined above in relation to the image file 60. The angle of rotation may be 90 degrees, 180 degrees or 270 degrees. The rotation direction may be clockwise or anticlockwise. The angle of rotation and/or the rotation direction of the image fragment may be calculated based on the unique image identifier.

Reordering the image fragment 70. The content of the image fragment 70 may be reordered or scrambled using a known reordering or scrambling algorithm. This reordering or scrambling may alter the order of the content that forms the elements of the image fragment 70. The reordering or scrambling may alter the order of the pixels of a raster image file.

Reversible geometric distortion of the image fragment 70. The image fragment 70 may be reflected so as to be the mirror image of the original image fragment 70. The reversible geometric distortion may define a central axis through the image fragment 70 and each pixel to one side of the axis may be swapped with a corresponding pixel at the same distance from the axis on the other side of the axis. In this way the image fragment 70 may be flipped along central axis. The central axis may be horizontal, vertical or at an intermediate angle. The geometric distortion may be applied so that there is a one-to-one mapping between pixels before rotation and after rotation. Stated differently: the image fragment 70 may be distorted so that no interpolation of pixels is required of the original image fragment 70 after the distortion is completed.

As shown in 305, once the image file 68 has been broken down in to a plurality of image fragments 70, and, if present in the process, the reversible transformations have been applied to the image fragments 70, the image fragments 70 can be scrambled to alter their position within the image file 68. The scrambling of the image fragments 70 is shown schematically at 74 in FIG. 2. The letters a-n in each of the image fragments show their position in the image file 68 prior to the scrambling. The position of the image fragments 70 within the image file 68 are reordered based on the image identifier associated with the image file 68. In the order shown at 74 the image fragments are shown schematically one after another in a line, however there may be some wrapping applied to the image fragments 70 so that they appear in generally the same or in the same pixel area as the image file 68.

In the case that the image file comprises a series of images, each image of the series may be sliced, transformed (when present) and scrambled separately. Alternatively, the series of images may be sliced, transformed where present and scrambled as a group. The image fragments of the series of images may be mixed together in the scrambled image.

The server 10 can apply a scrambling method to reorder the image fragments that takes as its input at least the unique image identifier associated with image file 60. The scrambling algorithm may also take as its input the number of image fragments 70 that are present in image file 68. The scrambling method may be configured to generate a range of numbers that correspond with the number of image fragments 70 present in the image file 68. The server 10 may be configured to, using the scrambling algorithm, calculate a range of numbers that has a maximum number equal to the number of image fragments 70 in the image file 68. The scrambling method may use the image identifier as the scrambling key to generate the scrambled position of each image fragment 70 within the scrambled image file 76. The scrambling method may use a pseudorandom number generator to generate the new position of each of the image fragments 70 within the scrambled image file 76. The seed for the pseudorandom number generator may be the unique image identifier.

As shown in 306, once the image fragments 70 have been reordered using the scrambling method, the image fragments 70 can be combined in to one scrambled image file 76. The scrambled image file 76 may be stored in a storage location 14 by the server 10.

As shown in 307, the scrambled image file 76 may optionally be encoded so that it can be reliably transmitted over a computer network 2 using a protocol that has been designed for the transmission of text characters. The encoding may use an encoding scheme, such as base 64, which encodes binary data in to a form that can be sent as a series of ASCII characters.

The scrambled image file 76 can be stored in a storage location 14 that can be publically accessed over a computer network 2, such as the internet. However, unless the computer and/or user knows how the image file has been scrambled, the original image file cannot be accessed. The above described method by which the image has been scrambled is advantageous because the reconstitution of the original image can be performed using techniques that are at a low level of processing intensity. The techniques are simple image transformations such as rotation, and the translation of the image fragments during the reverse of the scrambling procedure. This means the image can be unscrambled quickly using an internet browser a low level of processing requirement from the processing section 36 of the user terminal 30.

Figure 4:
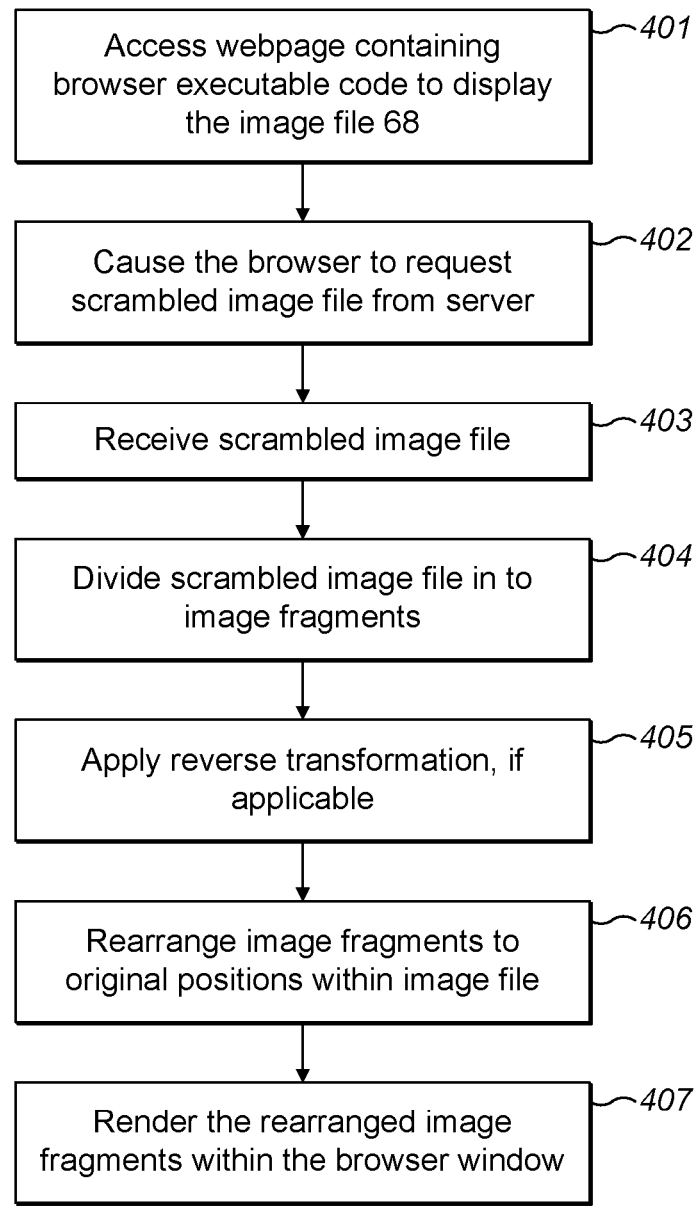
FIG. 4 shows a flow diagram of the process for unscrambling image files.

The transmission and display of the scrambled image file, in unscrambled form, are below described with reference to FIG. 4.

As discussed above, in a specific case, a user terminal 30 can be used by a user to request a webpage from a server 10 such as that shown schematically in internet browser 52. The webpage may comprise references to one or more images. The internet browser 52 interprets those references to images as being an instruction to display those one or more images within the display window of the internet browser 52. At least one of those images may be stored in a storage location 14 on the server 10 in a scrambled format as described above. For the internet browser to display the image contained in the scrambled image file 76 correctly, the reference to that scrambled image file 76 needs to include details of how to unscramble that scrambled image file 76. However, due to the nature in which the scrambled image file 76 is publically available for download, it is desired that the method by which the scrambled image file 76 is unscrambled remains secret. Furthermore, the unscrambled image file 76 needs to be presented within the internet browser window 53 in a way so that a user operating user terminal 30 cannot directly access the unscrambled image.

As shown in 401, the user causes the user terminal 30 running internet browser 52 to access a webpage from a server 10. The webpage includes at least one image reference to a scrambled image file 76. The image reference may also include a desired image display size. For instance, the image reference contained in the webpage may instruct the browser to display the image at a particular size. The size may be defined by the number of pixels along each axis. For example, the size may be 900px×400px.

The image reference to a scrambled image file 76 may comprise a reference to a file containing internet browser 52 executable code. This file may be stored in a storage location 14 of webserver 10. This executable code can be parsed by the internet browser 52 when the internet browser loads the webpage and the internet browser 52 can then execute the instructions contained in that executable code. The internet browser executable code may contain instructions to permit the internet browser 52 to unscramble the scrambled image file 76 that is referenced in the webpage. A reference to an image file or browser executable code may also be described as a link to an image file or browser executable code. The reference or link is interpreted by the internet browser as an instruction to import the image in to the webpage and/or run the code that is linked to. The browser executable code may have been processed so that, whilst it can be executed by the browser, is unable to be interpreted by a person. This processing may obfuscate the meaning of the code but still enable it to be executed by the browser. The browser executable code may be in the form of a scripting language that normally would be readable by a person and the process of obfuscating the script means that it is not normally readable by a person. As discussed above in relation to FIG. 1, another application may be capable of displaying content items received from a server 10. Therefore, this another application may be capable of interpreting the executable code described above so as to unscramble the scrambled image file 76 that is referenced in the webpage, or other code, stored on server 10.

The image reference to a scrambled image file may therefore comprise, in a specific example: a reference to browser executable code; the image identifier for the image; and/or a desired image display size. As discussed above the browser executable code may also be interpreted by other applications. Thus, when the internet browser 52, or another application, accesses a webpage containing an image reference to a scrambled image the internet browser 52 may execute the browser executable code.

As shown in 402, the browser executable code may cause the browser to request the scrambled image file from the server 10. The request may comprise the image identifier for the image. The request may also comprise a desired image display size.

The server 10 received the request for the scrambled image file from the browser. In response to this request the server 10 sends the scrambled image file associated with the image identifier to user terminal 30 running internet browser 52. If the scrambled image request comprised a desired image display size then the server 10 may select the scrambled image that has the most appropriate size for that desired image display size. As described above in relation to 302, when the original image file was uploaded to the server 10, the server 10 may have resized the original image in to a plurality of image sizes. Thus the server 10 is able to select the most appropriate size for that descried image display size. The most appropriate image size may be the converted image file that has the closest size to that of the desired image display size.

As shown in 403, the user terminal 30 and thus internet browser 52 receives the scrambled image file 6 sent by the server 10.

As shown in 404, the internet browser 52 may then execute the browser executable code to divide the scrambled image file into the image fragments. The breaking down of the scrambled image file into image fragments may be defined by a slicing map. In this case, the slicing map defines how to slice a scrambled image file in to the same image fragments that the original image file was sliced in to when constructing the scrambled image file. In any case, the scrambled image file is broken down in to the same image fragments that the original image file was sliced in to. The description above regarding slicing map 72 applies equally to the process of slicing the scrambled image file. The breaking down of the scrambled image in to image fragments may be based on the image identifier.

As shown in 405, if reversible transformations have been applied to the image fragments then the browser executable code may optionally cause the internet browser to apply reversible transformations to at least one of the image fragments 70. The reversible transformation that is applied to a particular image 70 may be calculated based on the image identifier. The description of reversible image transformations given in relation to 304 above applies equally to the reverse transformations applied to image fragments during the reverse transformation to be applied to the image fragment in 405. The reverse image transformations apply the opposite reversible transformation(s) to the image fragment to restore the image fragment to its original appearance when part of the original image.

As shown in 406, once the scrambled image file 76 has been broken down in to a plurality of image fragments 70 and, if present in the process, the reverse image transformations have been applied to the image fragments 70 then the image fragments 70 can be reordered to restore the image contained in the scrambled image file. The browser executable code may instruct the browser to apply an unscrambling method to reordering the image fragments 70 that takes as its input at least the unique image identifier associated with image file 60. The unscrambling algorithm may also take as its input the number of image fragments 70 that are present in scrambled image file 76. The unscrambling method may be the reverse of the scrambling method described in relation to 305 above. The unscrambling method may be configured to generate a range of numbers that correspond with the number of image fragments 70 present in the scrambled image file 76. The browser executable code may instruct the browser to, using the unscrambling algorithm, calculate a range of numbers that has a maximum number equal to the number of image fragments 70 in the scrambled image file 76. The scrambling method may use the image identifier as the scrambling key to generate the unscrambled position of each image fragment 70 within the image file 68. The unscrambling method may use a pseudorandom number generator to generate the original position of each of the image fragments 70 within the image file 68. The seed for the pseudorandom number generator may be the unique image identifier.

As shown in 407, once the image fragments 70 have been reordered using the unscrambling method, the browser executable code may then instruct the internet browser to render the reordered image fragments to a particular location within the browser window and/or in to a particular location within the web page that the browser is currently displaying. The rendering in the browser window may render image fragments in order so that the original image is restored. The browser executable code may instruct the internet browser to render each of the reordered image fragments to a different particular location within the web page so as to rebuild the original image.

In the case that the image file comprises a series of images, each image of the series may be sliced, reverse transformed (when present) and unscrambled separately. Alternatively, the series of images may be sliced, reverse transformed (when present) and unscrambled scrambled as a group.

So that the image cannot be easily copied from the browser window, the browser executable code may instruct the browser to render the image fragments in a format that means the browser does not recognise the reordered and reconstituted image fragments as an image file. This means that the normal options within the browser for manipulating images are not available to the user using the user terminal 30. The browser executable code may configure the internet browser 52 to draw the image fragments on to a virtual layer present within the browser window without identifying those image fragments as an image. The context menu normally associated with an image may not be enabled when the image fragments or the image are rendered in this way.

In the case that the image file comprises a series of images, the browser may render each of the series of images in turn or as otherwise instructed by the configuration of the image file.

The internet browser may be capable of interpreting a standard for writing webpages called HTML 5. HTML 5 defines a tag called canvas. This tag instructs the browser to form a particular sized layer within the webpage that is being viewed in the browser window. The browser executable code may instruct the browser to render the image fragments and/or image file within the particular sized layer that has been created in response to the canvas tag.

The browser does not reconstruct an image file in the internet browser, such as a JPEG image file. Instead the browser executable code instructs the browser to place the individual image fragments directly on to the virtual layer within the browser window. This prevents an actual image file from being created in the browser memory which could then be seen and downloaded from the cache of the browser.

The browser executable code may also instruct the browser to overlay text, such as a title, caption and/or byline, on the rendered image.

The process for converting image files in to a secure format for storage of those image files as described with reference to FIGS. 2 and 3 above, may be used by parties that do not have access to and/or know the algorithm in which the image files are converted to the secure, scrambled format. In this situation, it may be advantageous if a mechanism can be provided that accepts an image file from an upload device, converts that image file to the secure format, and transmits the scrambled image file to the upload device or another device that is configured to store the scrambled image file. In this way, a scrambled image file can be provided without the party that controls the upload device knowing the specifics of the securing algorithm. Such a mechanism is illustrated in FIG. 5.

Figure 5:
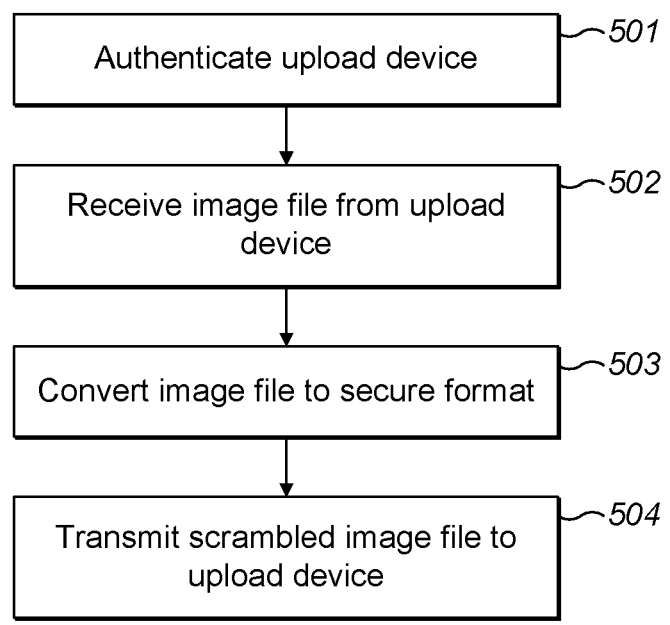
FIG. 5 shows a flow diagram of a process for automating the supply of scrambled image files to an upload device.

FIG. 5 shows a flow diagram of a process for automating the supply of scrambled image files based on image files received from an upload device. The upload device may be a user terminal 30 or may be another server configured in a similar general manner to server 10.

As shown in 501, the upload device may connect to server 10. Thus server 10 may accept a connection from the upload device. To establish that upload device is permitted to access the scrambling methods implemented by server 10, the server 10 may require that upload device authenticates with the server 10. The authentication may be by any form that means that the server 10 can establish the identity of the upload device and that the upload device has been given the authority to transfer the image file to the server 10 for scrambling. By way of example, the authentication may be in the form of the upload device providing a username and password to the server 10. Alternatively, the authentication may be in the form of the upload device providing an access token to the server 10. The access token may have been generated by an authorization server to which the upload device has separately authenticated using a set of credentials associated with that authorization server. In response to the upload device authenticating with the authorization server an access token may be generated.

As shown in 502, the upload device may be permitted to upload an image file to the server. In this way, the server 10 may receive an image file from the upload device. The upload device may only be permitted to upload the image file once it has undergone the authentication process described with reference to step 501 above. The upload of the image file may be equivalent to step 301 described above with reference to FIG. 3 in which a user uploads at least one image file 60 to the server 10 over computer network 20. In this case, a user may not be directly involved in the upload and the upload device may upload the image file 60 to the server instead.

As part of 502, the upload device may also specify the size of the scrambled image that is to be returned. The scrambled image size may be specified in the form of at least one of a desired width, a desired height, desired dimensions. If only one of the desired width and desired height is provided by the upload device then the other of these dimensions may be calculated by the sever 10. The server 10 may therefore be configured to receive an image file from the upload device and also receive a desired scrambled image size for that image file from the upload device. The server 10, in response to receiving a desired scrambled image size request, may be configured to resize the image file to the desired scrambled image size before undertaking the scrambling process. Alternatively, the scrambled image file may be resized. The resizing process may be as described above in relation to FIG. 3 with reference to 302. In the absence of the desired scrambled image size the server may be configured to return a scrambled image file that has the same dimensions as the uploaded image file.

As shown in 503, the server 10 may be configured to convert the image file uploaded by the upload device to a secure format. The methods by which it may convert the image to the secure format are as described above with reference to FIGS. 2 and 3.

Once the image file has been converted to the secure format, the server 10 may provide the scrambled image file to the upload device as shown in 504. The server 10 may deposit the scrambled image file in a storage location 14 that can be publically accessed over a computer network 2, such as the internet. Alternatively, the scrambled image file may be transmitted to the upload device. Such a transmission may be a response communication to the communication, received by server 10, that was sent by upload device requesting the scrambling of an image file. The transmission may comprise the scrambled image file.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for the display of an image in a display area, the method comprising the steps of:
   requesting, from a server, a scrambled image file using an image identifier, the scrambled image file containing the image in a scrambled form;
   receiving the scrambled image file;
   dividing the scrambled image file into a plurality of image fragments, the image fragments having a first order within the scrambled image file, wherein dividing the scrambled image file into a plurality of image fragments is defined by a slicing map generated using the image identifier, the slicing map defining the boundary between image fragments within the scrambled image file, each image fragment having a shape and the slicing map being generated such that the shape of at least some of the image fragments are different to the shape of at least some of the other image fragments; and
   rendering the image fragments on to the display area in a second order generated using the image identifier to display the image in unscrambled form.

2. The method as claimed in claim 1, wherein requesting a scrambled image file comprises sending a request to the server for the scrambled image file, the request comprising the image identifier.

3. The method as claimed in claim 2, wherein the request comprises a desired image size for the image, and the received scrambled image file comprises an unscrambled image size.

4. The method as claimed in claim 3, wherein the desired image size defines the dimensions of the image.

5. The method as claimed in claim 1, wherein the image identifier is associated with the image.

6. The method as claimed in claim 1, wherein dividing the scrambled image file into a plurality of image fragments is based on the image identifier.

7. The method as claimed in claim 1, wherein each image fragment has a position within the scrambled image file as defined by the first order, and the reordering the image fragments comprises altering the position of each image fragment based on the image identifier.

8. The method as claimed in claim 1, wherein rendering the image fragments on to the display area comprises rendering each of the reordered image fragments to a different particular location within the display area.

9. The method as claimed in claim 1, wherein rendering the image fragments on to the display area comprises rendering the image fragments on to a virtual layer within the display area.

10. The method as claimed in claim 1, wherein rendering the image fragments on to the display area comprises rendering the image fragments on to the display area without identifying those image fragments as an image.

11. The method as claimed in claim 1, wherein rendering the image fragments on to the display area comprises drawing the image fragments on to a canvas layer.

12. The method as claimed in claim 1, wherein rendering the image fragments on to the display area comprises rendering the image fragments on to the display area of a browser window.

13. The method as claimed in claim 1, the method comprising, after dividing the scrambled image file into a plurality of image fragments, applying a reverse image transformation to at least one image fragment to form a transformed image fragment; and wherein rendering the image fragments comprises rendering the transformed image fragments in place of the respective at least one image fragments.

14. The method as claimed in claim 13, wherein the reverse image transformation applied to a particular image fragment comprises one or more of a group of image transformations.

15. The method as claimed in claim 14, wherein the group of image transformations comprises:
   applying a color offset to the image fragment, rotating the image fragment, and
   applying a reversible geometric distortion to the image fragment.

16. A method for scrambling an image file, the method comprising:
   receiving the image file, the image file being associated with an image identifier;
   dividing the image file into a plurality of image fragments, the image fragments having a first order within the image file, wherein dividing the image file into a plurality of image fragments is defined by a slicing map generated using the image identifier, the slicing map defining the boundary between image fragments within the image file, each image fragment having a shape and the slicing map being generated such that the shape of at least some of the image fragments are different to the shape of at least some of the other image fragments; and generating a scrambled image file comprising the plurality of image fragments, the image fragments having a second order, generated using the image identifier, within the scrambled image file.

17. The method as claimed in claim 16, wherein dividing the image file into a plurality of image fragments is based on the image identifier.

18. The method as claimed in claim 16, comprising reordering the image fragments into the second order based on the image identifier.

19. The method as claimed in claim 18, wherein each image fragment has a position within the image file as defined by the first order, and the reordering the image fragments comprises altering the position of each image fragment based on the image identifier.

20. The method as claimed in claim 16, the method comprising, after dividing the image file into a plurality of image fragments, applying an image transformation to at least one image fragment to form a transformed image fragment; and wherein the scrambled image file comprises the transformed image fragments in place of the respective at least one image fragment.

21. The method as claimed in claim 20, wherein the image transformation applied to a particular image fragment comprises one or more of a group of image transformations.

22. The method as claimed in claim 21, wherein the group of image transformations comprises: applying a colour offset to the image fragment, rotating the image fragment, and applying a reversible geometric distortion to the image fragment.

23. The method as claimed in claim 16, the method comprising generating the image identifier for the image file.

24. The method as claimed in claim 16, the method comprising receiving a desired scrambled image size, and, prior to dividing the image file, resizing the image file according to the desired scrambled image size.

25. The method as claimed in claim 16, the method comprising transmitting the scrambled image file.

26. A method for the display of an image in a display area, the method comprising:

requesting, from a server, a scrambled image file using an image identifier, the scrambled image file containing the image in a scrambled form;

receiving the scrambled image file;

dividing the scrambled image file into a plurality of image fragments, the image fragments having a first order within the scrambled image file, wherein dividing the scrambled image file into a plurality of image fragments is defined by a slicing map generated using the image identifier, the slicing map defining the boundary between image fragments within the scrambled image file, each image fragment having a shape and the slicing map being generated such that the shape of at least some of the image fragments are different to the shape of at least some of the other image fragments;

applying a reverse image transformation to at least one image fragment to form a transformed image fragment, wherein the transformation is calculated based on the image identifier; and rendering the image fragments on to the display area in a second order generated using the image identifier to display the image in unscrambled form, wherein rendering the image fragments comprises rendering the transformed image fragments in place of the respective at least one image fragments.

* * * * *